Sept. 26, 1944.  R. COVER ET AL  2,358,961
METHOD OF AND MACHINE FOR HUSKING CORN
Filed Dec. 27, 1940  8 Sheets-Sheet 1
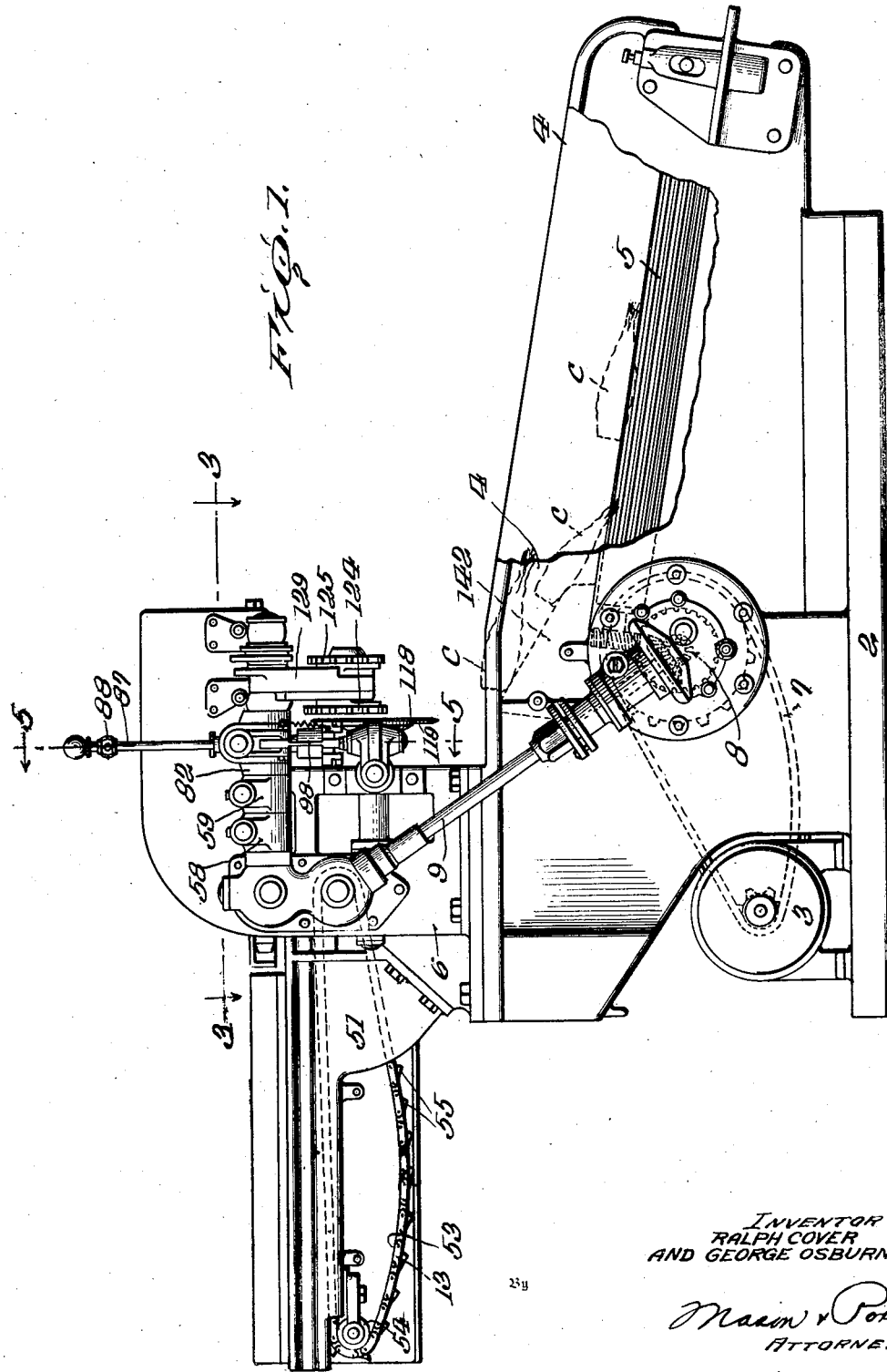
INVENTOR
RALPH COVER
AND GEORGE OSBURN
ATTORNEYS

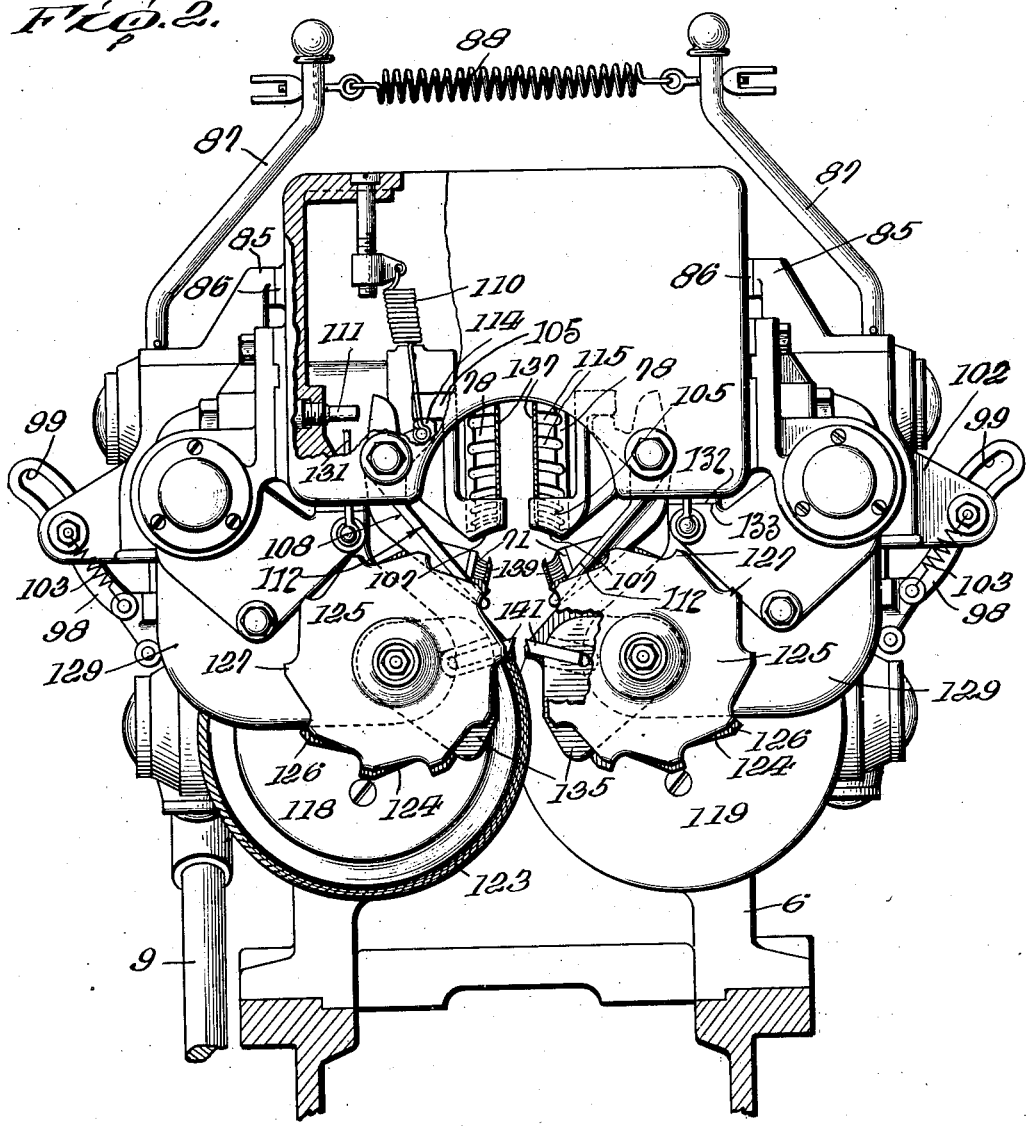

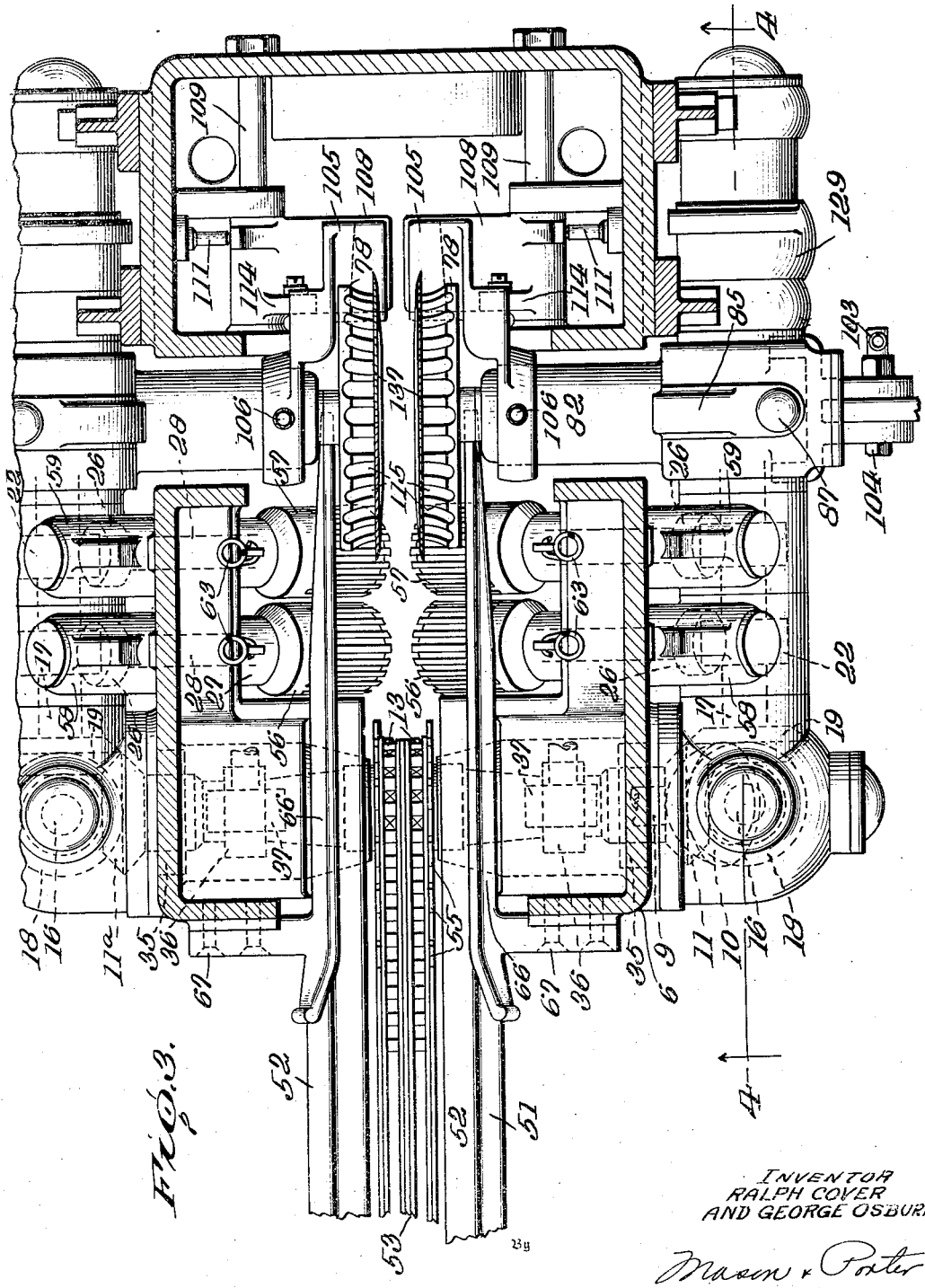

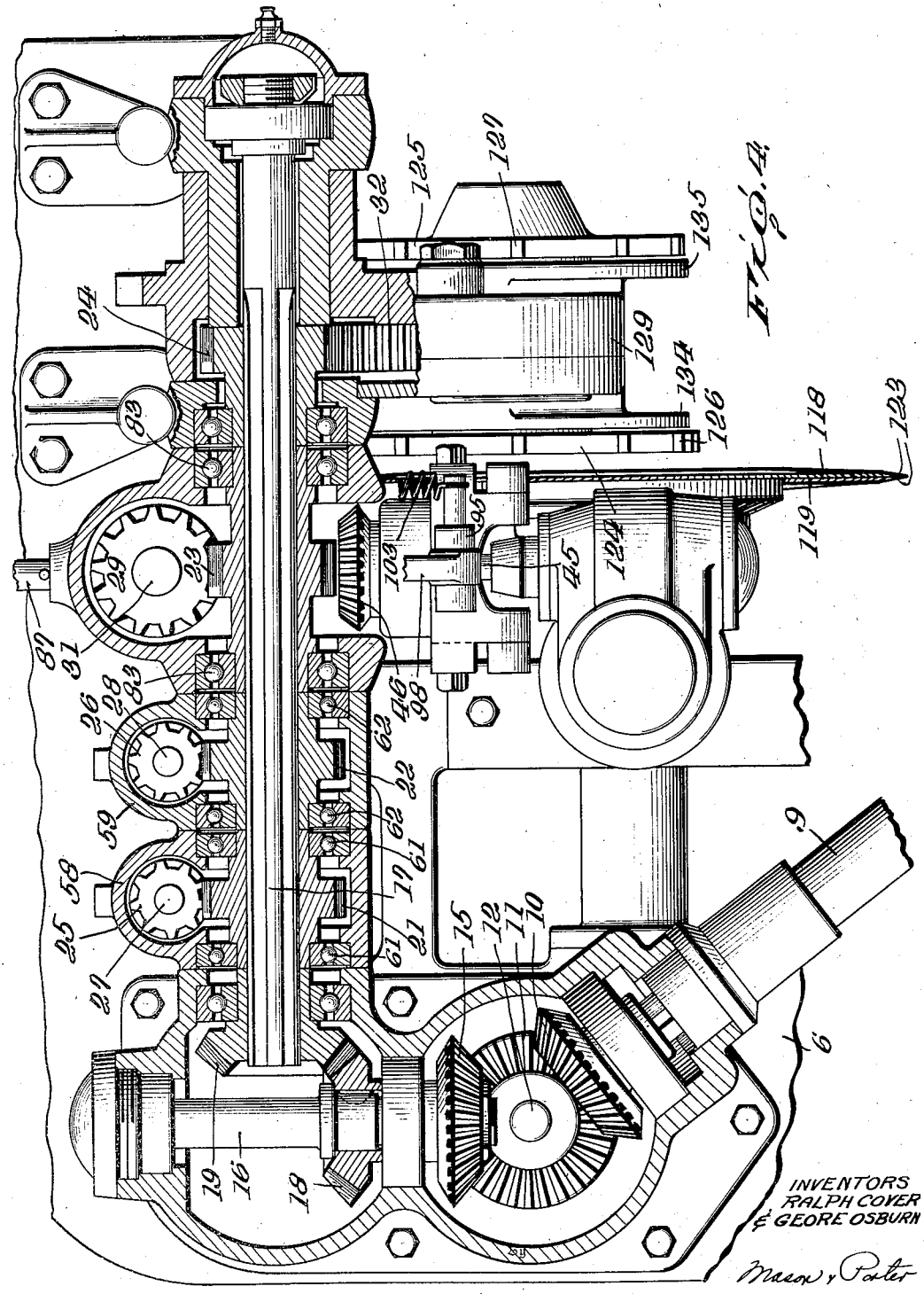

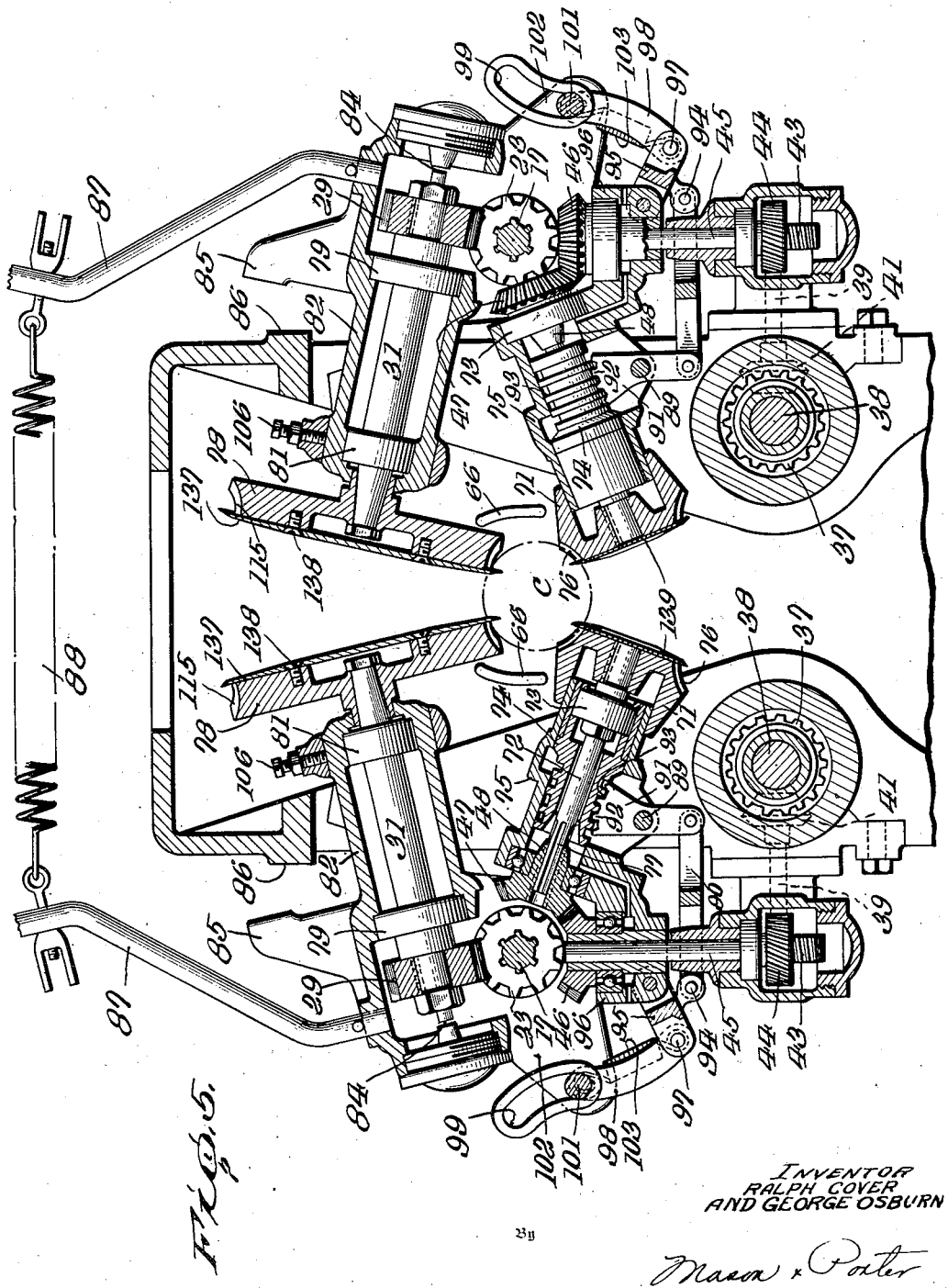

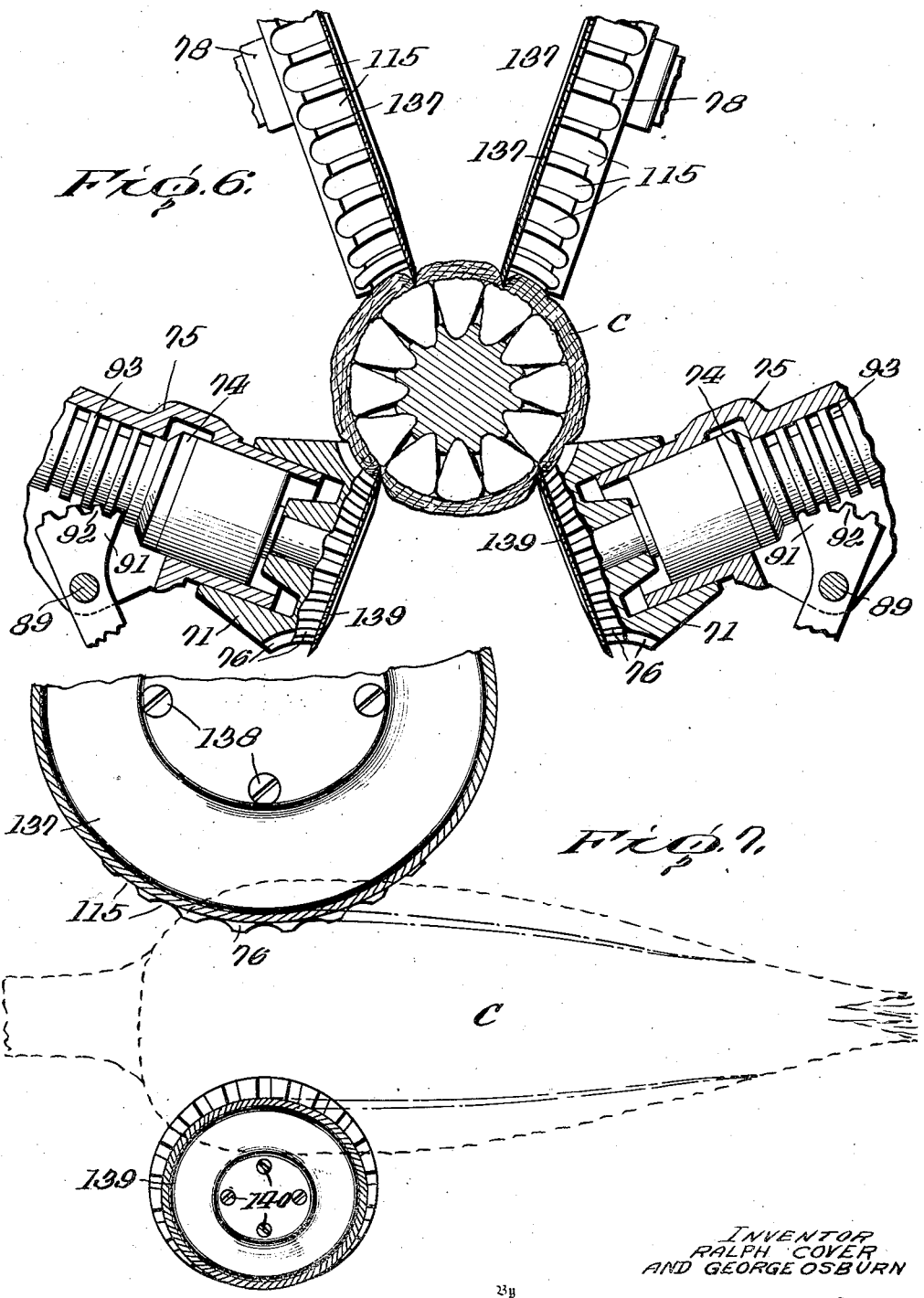

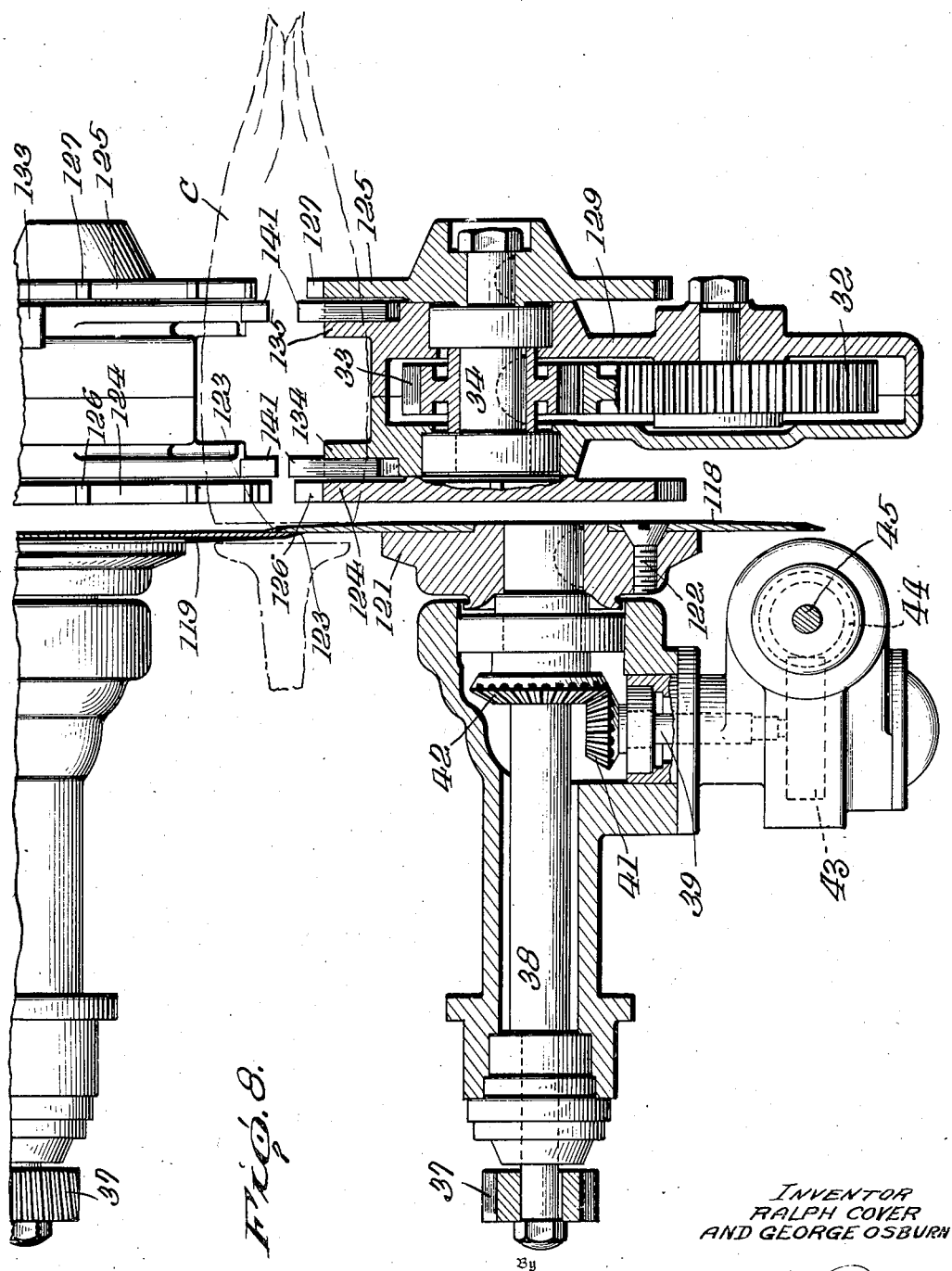

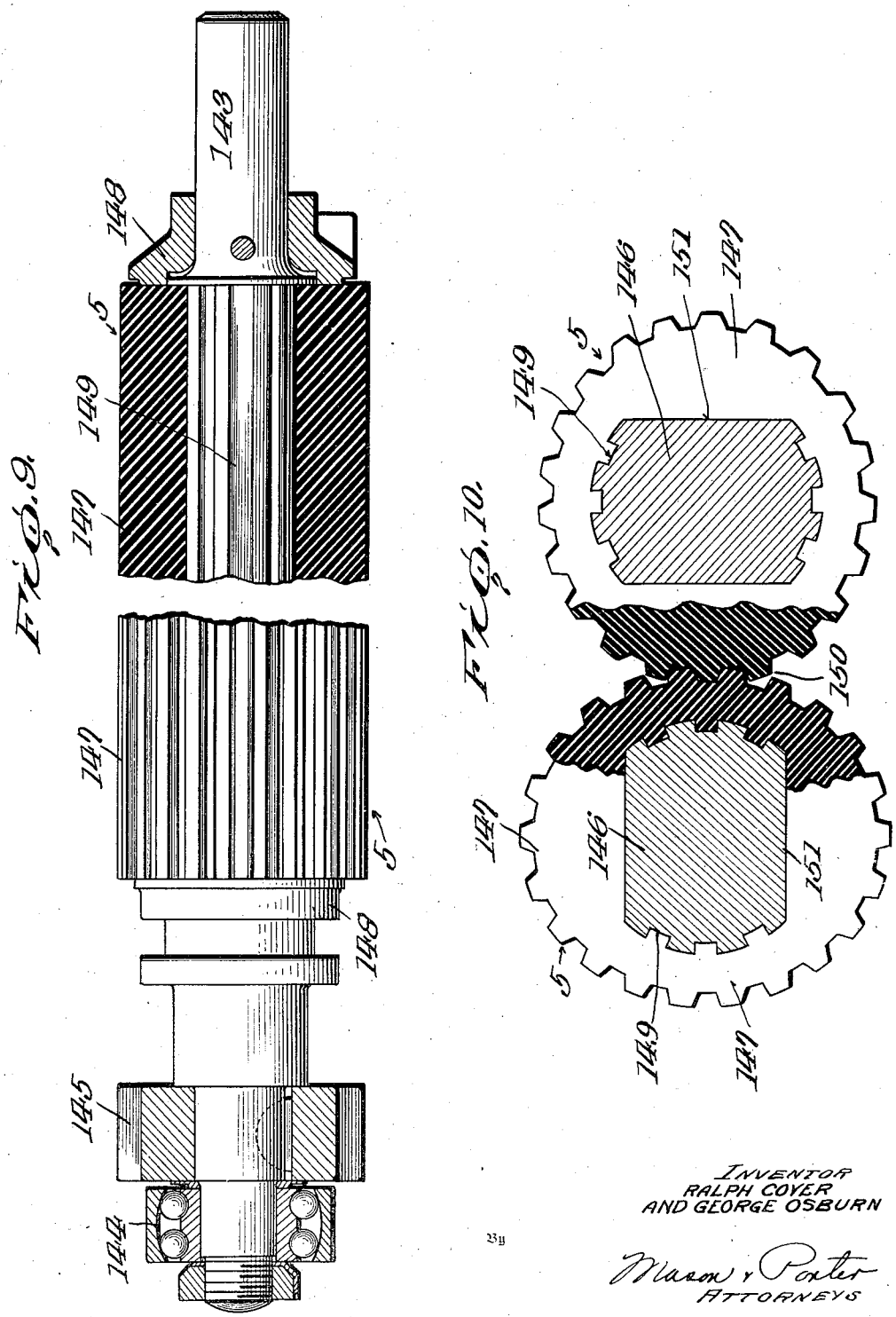

Patented Sept. 26, 1944

2,358,961

UNITED STATES PATENT OFFICE 2,358,961

METHOD OF AND MACHINE FOR HUSKING CORN

Ralph Cover and George Osburn, Westminster, Md., assignors to The United Company, Westminster, Md., a corporation of Maryland Application December 27, 1940, Serial No. 371,978

18 Claims. (Cl. 130—5)

The invention relates to new and useful improvements in a corn husking machine wherein is provided means for feeding corn ears one after another in the direction of their length into the machine.

An object of the invention is to provide a plurality of slitting knives effective to simultaneously slit the husk of the corn ears longitudinally in a plurality of circumferentially spaced places, thereby to facilitate the removal of the husks.

Another object of the invention is to provide in a machine of the character stated a plurality of rotary corn husk slitting knives cooperatively arranged and movable relative to the corn ears and each other during the slitting function in a manner for following the contours of the corn ears regardless of the size thereof, thereby to efficiently slit the corn husks throughout substantially the whole length from tips to butts without danger of injuring or abusing the relatively delicate grains beneath said husks.

Another object of the invention is to provide means effective to cause certain of said rotary slitting knives to move laterally of the direction of the feed movement of the corn ears, or in the direction of the axes of rotation of said knives, while the slitting function is being performed, thereby to draw apart or loosen as well as slit the corn husks and additionally facilitate subsequent removal thereof.

Another object of the invention is to provide a novel machine of the character stated in which there is included feed-in chain equipment for carrying the corn ears from a receiving trough into engagement with driven feed-in rollers which act to transfer the corn ears by endwise movement, small ends foremost, to aligning devices including aligning rolls and opposing presser wheels effective to position the ears with their butts properly aligned with rotating debutting knives, means for mounting the rolls and wheels for independent movement to enable them to properly engage and compensate for the varying contours of corn ears of different sizes and including presser plates engageable with the corn ears to cause said wheels to follow the contour of said ears, slitting knives mounted on and rotatable with said aligning rolls and presser wheels, carrier wheel assemblies for engaging corn ears aligned by said aligning devices and carrying them past the debutting knives and for directing the debutted ears to the husking rolls, and relatively stationary ruffling fingers associated with the carrier wheel assemblies and so positioned that the husks previously slit while moving into butt aligning position are torn thereby from their clinging engagement with the grain rows as the ears are moved through the debutting knives.

Another object of the invention is to provide novel tumbler or husking roll equipments comprising rubber husking rolls elliptical in cross section and having non-circular, rigid cores disposed to provide for preponderant potential yielding of the rubber throughout the major axes of said elliptical rolls thereby to provide for a sort of kneading action of the rubber effective to more efficiently tear off the corn ear husks than has been possible in prior uses of conventional rolls.

Another object of the invention is to provide a novel method of the character stated in which the husks are pulled laterally while they are being longitudinally slit, thereby to facilitate the dehusking operation.

With the above and other objects in view which will more fully appear, the nature of the invention will be more clearly understood by following the description, the appended claims, and the several views illustrated in the accompanying drawings.

In the drawings:

Figure 1 is a side elevation of a machine embodying the features of the invention, parts being broken away.

Figure 2 is an enlarged fragmentary and elevation of the upper portion of the machine illustrated in Figure 1, parts being broken away.

Figure 3 is a horizontal sectional view taken on the line 3—3 on Figure 1.

Figure 4 is a vertical longitudinal sectional view taken on the line 4—4 on Figure 3.

Figure 5 is an enlarged fragmentary vertical cross sectional view taken on the line 5—5 on Figure 1.

Figure 6 is an enlarged fragmentary, somewhat diagrammatic vertical cross sectional view illustrating engagement of the husk slitting knives with an ear of corn.

Figure 7 is a central vertical longitudinal section through the parts illustrated in Figure 6.

Figure 8 is a horizontal sectional view through one of the debutting knife assemblies and cooperating carrier mechanisms.

Figure 9 is a plan view and part central longitudinal section of one of the tumbler or husking rolls.

Figure 10 is a detail vertical cross section illustrating the cooperative engagement of two of the tumbler or husking rolls.

In the machine herein illustrated as an example of embodiment of the invention there is included a bed 2 upon which may be mounted an electric motor 3. A frame 4 located upon the bed 2 serves as a mounting for the husking tumblers 5 and as a support for the head frame 6 upon which the major portion of the mechanisms of the present invention are carried.

Driving assembly

A chain drive 7 may be employed to drive the cross shaft for the tumblers 5 upon which there is mounted a bevel gear 8 engageable with a complementary gear carried upon the head drive shaft 9. See Figure 1.

Referring now to Figures 3 and 4 the drive shaft 9 has, at its upper end, a bevel gear 10 meshing with a similar gear 11 carried by the horizontal drive shaft 12 for the feed-in chain drive sprockets 13. A gear 11a identical to the gear 11 is mounted upon the opposite end of the drive shaft 12 and each of the gears 11 and 11a are arranged in mesh with gears 15 carried upon vertical intermediate shafts 16 one located upon each side of the head frame 6 and serving respectively to drive the two horizontal parallel and spaced apart primary drive shafts 17 through cooperating bevel gears 18 and 19.

Carried upon the primary shafts 17 there are helical cut gears 21, 22 and 23 and spur gears 24. Of these gears, 21 and 22 are in mesh respectively with similarly cut pinions 25 and 26 upon the feed-in roll drive shafts 27 and 28, the gears 23 are in mesh with gears 29 on the presser wheel drive shafts 31 and the gears 24 are in mesh with the intermediate gears 32, (see Figs. 4 and 8) which gears 32 are in turn in mesh with gears 33 carried by the carrier wheel drive shaft 34.

Referring now to Figs. 3, 4 and 8, the drive shaft 12 carries, between the feed-in chain sprockets 13 and shaft bearings 35, a pair of helical cut gears 36 which mesh with similarly cut gears 37 carried upon horizontal, parallel and spaced apart shafts 38. The shafts 38 comprise the debutting knife drive shafts and are located relative to the operating parts, on the head frame 6, as best indicated in Fig. 8.

Mounted perpendicularly with respect to the shafts 38, and in a horizontal plane, are intermediate shafts 39 having bevel gears 41 at their inner ends in mesh with bevel gears 42 carried upon the adjacent portions of the shafts 38. The intermediate shafts 39 are further provided with helical cut gears 43 at their outwardly directed ends, which mesh, respectively, with similar gears 44 carried by second intermediate and vertically disposed shafts 45. At the upper ends of the shafts 45 are bevel gears 46 which mesh with similar gears 47 carried by the aligner drive stub shafts 48, the latter shafts being mounted upon axes which extend angularly downwardly toward one another in a common vertical plane including the axes of the presser wheel drive shafts 31. See Figures 4 and 8.

From the foregoing it will be noted that all power operated parts of the machine may be driven from a single power unit and all are possessed of positive drive connections at fixed relative speed ratio although, as will hereinafter appear, each subassembly may perform its full and required operation, as to time and amplitude, without regard to similar work phases of the remaining and cooperating sub-assemblies.

Feed-in assembly

Referring to Figs. 1 and 3, the feed-in mechanism may comprise a frame 51 mounted upon the head frame 6 and extended generally in a horizontal direction. The frame 51 is formed with spaced apart inner wall surfaces 52 which diverge upwardly, as the walls of a hopper, to provide a receiving table upon which the ears of corn may be dropped for disposition upon the endless feed-in chain 53, which chain is positioned horizontally along the space immediately between the lower edges of the surfaces 52. A pair of idler sprockets 54, rotatably mounted upon the frame 51, carry one end of the chain loop, and the other end thereof being disposed over the driven sprockets 13 upon the cross shaft 12.

The chain 53, as best shown in Figs. 1 and 3, is formed with its outermost links provided with teeth 55 upon which the ears of corn may rest and which prevent relative slippage between chain and ears as the ears are drawn thereupon toward the feed-in rollers 56 and 57.

The feed-in rollers 56 and 57 are arranged in pairs, the rollers 56 being carried on the shafts 27 and the rollers 57 on the shafts 28. The shafts 27 and 28 are rotatably mounted within hollow arms 58 and 59 respectively, each of which is in turn pivotally mounted upon the adjacent shafts 17, through the medium of anti-friction bearings 61 and 62 respectively, as indicated in Fig. 4. Tension springs 63, see Fig. 3, serve yieldingly to draw the arms 58 and 59 with their corresponding feed-in rollers 56 and 57 upwardly until resisted by suitable stops (not shown), with the trough formed by the pairs of rollers in operative registry with the corn as it travels endwise upon the chain 53.

This yielding mounting for the driven feed-in rollers permits the rollers to be drawn downwardly to pass the stalk of the ear therethrough, as when the ears are caused to move in a downward direction, during operation of the aligning mechanism. In addition such mounting of the rollers 56 and 57 may assure continuous passage of ears of all size from the chain to the aligning rolls while maintaining the under side of each ear in a certain, predetermined and fixed horizontal position and during this feeding movement of the corn ears the spring 63 will yield lightly for ears of larger diameter and the stops referred to serve to set the rollers for exact registry with ears of minimum diameters.

As shown in Figs. 3 and 5, guide rails 66 secured to the head frame 6, as shown at 67, may be employed to preclude lateral displacement of the ears during their travel along the inner end of the chain 53, over the rollers 56 and 57 and into engagement with the aligning mechanism.

Aligning assembly

The aligning assembly constitutes a very important assembly of the present machine.

This assembly, as shown in Figures 2, 3 and 5, comprises aligning rolls 71, fixed upon shafts 72 which in turn are rotatably mounted upon anti-friction bearings 73 carried by sleeves 74 slidably located in the fixed housings 75 upon which the aligner roll drive stub shafts 48 are mounted. As previously described, the axes of the two aligner roll shafts extend angularly downwardly toward one another in a common vertical plane including the axes of the pressure wheel drive shafts 31, and the sleeves 74 may thus move along such angularly extending axes to cause the aligning rolls to move toward and away from one another, and at the same time to vary the position of the work engaging and concave surfaces 76 of the rolls correspondingly toward and away from the central vertical plane of the aligning assembly, as well as downwardly and upwardly. It is this feature of the aligner roll mounting that permits the corn to move with its under side in a certain and predetermined fixed path from the feed-in chain and horizontally over the aligning rolls even though successively treated ears may differ widely as to their diameter.

Driving engagement between the stub shafts 48 and roll shafts 72 is maintained by splining the telescoping parts, as indicated at 77, so that free longitudinal movement of the shafts 72 may take place as the sleeves 74 are shifted.

Before describing further the structural and operating characteristics of the aligner rolls it is necessary to note the relationship of the presser wheels with respect thereto. These wheels 78 of which there are two in number, are independently mounted and driven as are the two aligner rolls 71 each being fixed upon one of the drive shafts 31 (see Fig. 5). The shafts 31 may be supported on anti-friction bearings 79 and 81 carried within housings 82 pivotally mounted, through the medium of anti-friction bearings 83, upon the adjacent shafts 17 (see Fig. 4). End thrust bearings 84 may serve to prevent axial movement of the wheel shafts 31 which might otherwise occur during operation. The presser wheels 78 may thus be swung through an arc in a vertical plane common to the axes of the aligner rolls 71 as they are caused to do during passage of the ear of corn thereunder in a degree determinable by the diameter of the ear.

Means for limiting downward swinging movement of the presser wheels 78 to a position just sufficient to insure of their engagement by ears of minimum diameter may comprise stop lugs 85 formed on the housings 82 which may engage surfaces 86 formed on the head frame 6. Hand grips 87 may be provided on the housings 82 for manual manipulation of the presser wheel and aligner roll assemblies, and these hand grips, which are in the nature of upwardly extended levers, may be connected by a coiled spring 88 effective to yieldably urge the presser wheels against the travelling corn ears, or in a direction for causing the stop lugs 85 to engage the surfaces 86.

Referring to Figs. 3 and 5, the aligner shaft housings 75 each have pivotally mounted thereon, at 89, plates 91, formed with teeth 92 in arcuate array and engageable with teeth 93 circumscribing the outer walls of the sleeves 74 in such manner that pivotal movement of the plates 91 results in right line movement of the sleeves 74 with their associated aligner rolls 71. Pivotally connected to the plate 91, on the remote side of their pivotal axes 89, are rigid links 90, which in turn are pivotally connected at 94 to bell-crank elements 95 pivoted upon the portions 96 of the housing 75, on the outer sides of the vertical shafts 45. The elements 95 have, pivotally connected thereto at 97, arms 98 provided with arcuate slotted portions 99 at their outer ends within which cylindrical stops 101 are disposed and eccentrically mounted upon the portions 102 of the housings 82. Tension springs 103 interconnect the bell-cranks 95, on the center 97, and the portions 102 of the housings 82 on the axes of the mountings for the stops 101, thus to maintain the stops 101 yieldingly engaged with the innermost ends of the slotted portion 99 of arms 98. This arrangement operates through the linkage described, to cause the aligner rolls 71 to move away from the central working axis of the machine as the associated presser wheels 78 are raised and to move toward said axis as the wheels 78 are lowered, although, because of the slotted arms 98 and springs 103, the wheels 78 may move downwardly without accompanying relatively inward movement of the aligner rolls 71. The normal relationship between presser wheel movement and aligner roll movement may be adjusted by the simple expedient of turning the cylindrical stops 101 on their eccentric mountings, as by turning the heads 104 thereof.

Each of the presser wheels 78 has associated therewith a fixed presser plate 105 fixed, as shown at 106 in Figs. 3 and 5, to the adjacent housing 82 and each presenting a work engaging surface 107, see Figs. 2 and 5, extending away from the lower portion of the adjacent presser wheel in the direction of travel of the corn and fashioned to conform substantially to the contour of an ear of corn as it rests in position for delivery to the carrier wheels.

Located beneath the surfaces 107 of the presser plates 105, and for engagement with the under sides of the ears as they pass into position prior to delivery to the carrier wheels, are a pair of retarding plates 108, see Fig. 2. The retarding plates 108 are pivotally mounted at 109 upon the frame 6 and each is drawn yieldingly upwardly upon its pivotal mounting by adjustably mounted tension springs 110, to positions determinable by adjustable stops 111. The stops 111 are preferably set so that the under side of the corn may depress the plates slightly against the tension of the springs 110, as it is passed from between the presser wheel and aligner roll assemblies thereby to cooperate with the presser plates 105 in retarding endwise movement of the ear so that it is compelled to follow over and downwardly about the curvature of the spaced aligner rolls, for purposes hereinafter specifically described. As in the case of the surfaces 107 of the presser plates 105, the retarding plates 108 are formed with work engaging surfaces 112 which substantially conform in contour to the ear as it moves to its final aligned position prior to delivery to the carrier wheels. The plates 108 are each provided with arm portions 114 presenting bosses against which the adjacent under side portions of the presser plate 105 may bear, when the presser wheel assemblies move toward their downward limit of travel, thus to urge the retarding plates downwardly against the force of the springs 110 and to facilitate descent of the ear into engagement with the carrier wheels.

With reference to Fig. 5, the concave work engaging surfaces of the aligner rolls 71 are preferably transversely grooved, as are the similar concave surfaces 115 of the presser wheels 78, in order to assure non-slipping engagement with the ear. In like manner the feed-in rolls 56 and 57 may be formed with transverse grooves on the outer surfaces thereof to assure efficiency in the feeding of the ears to the aligning assembly.

*Cutting assembly*

The cutting assembly includes a pair of circular cutting knives 118 and 119 fixed upon hub members 121, as by screws 122, which in turn are mounted upon the shafts 38 to turn therewith as shown in Fig. 8 and cooperating pairs of driven carrier wheels between which the corn is engaged and carried downwardly past the cutting knives.

The cutting knives 118 and 119 are arranged with their cutting edges overlapping at a point directly beneath the central axis of the ear, at the shoulder thereof, when in its final aligned position. As indicated in Figs. 2 and 4 the outwardly directed face of each of the knives, on its ground cutting edge, is serrated as shown at 123. The direction of rotation of the knives is toward one another with respect to the descending ears.

The carrier wheels may comprise two pairs of wheels 124 and 125 respectively, the wheel 124 being mounted upon that end of each of the shafts 34 adjacent to the cutting knives and the wheels 125 being mounted upon the opposite ends of the shafts 34. The wheels 124 are formed with grip teeth or projections 126 and the wheels 125 with similar teeth or projections 127 but of lesser height. Both sets of teeth or projections 126 and 127 serve to provide positive grip on the ears as they contact therewith. The spacing of the carrier wheels relative to the length of the shafts 34 and to the cutting knives is such that the ears are gripped at points spaced apart intermediate their lengths and forwardly of the butt section but sufficiently close thereto that the ears may be firmly held against displacement during the actual debutting process.

Each of the driving gear trains for the carrier wheel driven shafts 34 previously described is contained within a housing 129, said housings being in turn pivotally mounted about the centers of the primary shafts 17, and each housing 129 is drawn yieldingly upwardly by tension spring means 131 until resisted by engagement between the stop surfaces 132 and 133 of the housing and head frame 6 respectively, as shown in Fig. 2. This arrangement results in holding the pair of carrier wheels in immediate position for engagement with the ear as it moves over and about the aligner rolls 71 to its final aligned position, at which time the carrier wheels, by their tooth portions, function to grip the ear and to carry it downwardly past the cutting knives thereby to sever the butt. The provision of the pivotal mounting for the carrier wheel assemblies and the springs 131 serves to urge the opposed carrier wheels of each pair toward one another and hence toward the corn ear presented thereto so that no matter what diameter corn ear is aligned for debutting, the wheels may grip it with uniformness and carry it downwardly past the driven debutting knives.

In order to facilitate removal of the ears from engagement by the teeth upon the conveyor wheels after the butt has been severed, the housing 129 is provided with flanges 134 and 135 which extend slightly beyond the teeth or projections 126 and 127 respectively below the center lines of the conveyor wheels as best shown in Fig. 2.

*Husk slitting and ruffling elements*

The improved corn husk slitting knife arrangement constituting an outstanding feature of the present invention is best shown in Figs. 2, 5, 6 and 7. A rotary slitting knife 137 is removably secured by screws 138 to the inner face of each presser wheel 78 with its cutting edge projecting beyond the periphery of the respective wheel a distance sufficient to properly slit the corn husks but insufficient to cut into and damage the underlying delicate grains of corn. Similar rotary slitting knives 139 are removably secured by screws 140 to the inner faces of the aligner rolls 71, and the four slitting elements thus presented for engagement with the corn ears in circumferentially spaced relation thereabout during feed movement longitudinally of said ears through the machine engage and longitudinally slit the husks throughout substantially the whole length thereof from tip to butt. Because of the relative movement partaken of by the wheels 78 and rolls 71 in following the contours of individual ears of corn, the slitting knives 137 and 139 follow perfectly said contours, and said wheels and rolls definitely prevent the slitting edges of the knives from penetrating too deeply into the corn ears.

As has previously been described, the presser wheels 78 are yieldably urged against the travelling corn ears by the spring 88. Movement of the presser wheels 78 toward the rolls 71 may not alter the positions of said rolls because of the free movement of the pins 101 in the slots of the arms 98, but movement of the wheels 78 in the upward or opposite direction will act through the linkage 98, 95, 90, 91, 74 to cause the shafts 72 with their aligner rolls 71 to be drawn upwardly-outwardly thereby to cause the rolls 71 and the slitting knives to better follow the contours of the larger corn ears or ear portions which bring about this movement of the presser wheels. It will be obvious that the upward-outward movement of the aligner rolls 71 will cause the corn husk slitting knives 139 carried thereby to drag husk portions laterally-outwardly in addition to longitudinally slitting the same, and this lateral displacement or separation of the corn husks greatly facilitates the ultimate dehusking operation.

It should be obvious also that because of the mounting of the slitting knives directly upon the presser wheels 78 and aligner rolls 71, the knives 137 and 139 can follow the contours of the corn ears and efficiently slit the husks thereon from the tips of the ears all the way back to the ear butts, or beyond the points at which the stalk portions are debutted, as will be evident by reference to Figs. 7 and 8 of the drawings. This slitting of the husks enables the preliminary steps of the husking process to become more efficient as carried out by the ruffling elements.

The ruffling elements comprise relatively stationary and sharply pointed fingers 141 fixed in the flange portions 134 and 135 of the housing 129. These fingers 141, see Figs. 2 and 8, are pointed and inclined upwardly at about the central horizontal plane of the carrier wheel assemblies and serve as a corn ear is carried downwardly between the wheels during the operation of the cutting knives to engage with and tear away or loosen the husk which previously has been subjected to slitting by the four knives 137 and 139. When the ear has been delivered from the carrier wheels and permitted to fall downwardly toward the husking tumblers 5, it will have its husk partially free from the grain rows and in proper condition for complete husking under action of the tumblers 5.

It will be noted, see Fig. 1, that while the corn ears are caused to fall downwardly in the same position occupied during their travel between the carrier wheels, that there is disposed upon the bed frame 4 at the head of the tumblers 5, a guide platform 142 presenting an inclined upwardly directed surface beneath the falling ears. The inclined surface of the platform acts to cause each ear to strike, butted end first and to rebound so that the ear strikes the tumblers tip first. In striking tip first, the ear is thus best presented to the action of the rolls for husking, including the removal of its silk.

Operation

In operation, the debutting machine, constructed as herein described, may be fed by placing the green corn C as it is received from the grower directly upon the feed-in chain 53, which act is facilitated by the diverging hopper-like side walls 52 of the assembly 51. It is only necessaary that the ears be placed with the tip pointed toward the head frame 6. Any over-lapping of the ears, should this occur, will not result in jamming of the ears at the head mechanism because of the increased speed of the feed-in rollers 56 and 57 over the speed of travel of the chain 53. The side rails 66 function during the feed-in operation to laterally align each ear properly upon its axis of travel up to the point where it is engaged by the aligner roll and presser wheel assemblies.

In the event that the ear is of minimum diameter, the yieldingly mounted feed-in rollers 56 and 57 will remain in their normal position, but where the ears is of larger diameter the rollers 56 and 57 will yield slightly in a downward direction after initial engagement thereof by the presser wheel and aligner roll assemblies so that, without regard to ear diameter, there may always be full engagement between the rollers and the bottom side of the ear and hence proper conduct of the ear through the aligning mechanism, in the manner hereinafter described.

Once the ear has been engaged by the cooperating presser wheels 78 and aligner rolls 71, the presser wheels 78 will be elevated by virtually "riding up" upon the ear an amount determinable by the diameter of the ear at that portion of its length immediately in registry therewith. Movement of the presser wheels 78 upwardly through their pivotal mountings 83, will, through the linkage 98, 95, 90, 91, 74, cause the shafts 72 with their aligner rolls 71 to be drawn upwardly and outwardly, thus causing corresponding movement of the ear supporting surfaces 76 of the aligner rolls upon which the under side portions of the ear rests. The result of such operation of the parts is to cause the under side of the ear to lie in a certain and predetermined fixed horizontal position, without regard to the diameter of the ear and further without regard to slight irregularities in girth contour, one side relative to the other. This latter advantage is gained because of the fact that each presser wheel acts independently of the other, and each therefore controls its own aligner roll 71. Simultaneously with the engagement of the presser wheels 78 and the aligner rolls 71 with the travelling corn ears, the slitting knives 137 and 139 carried by and rotating with said wheels and rolls will longitudinally slit the husks on said ears from tip to butt regardless of the sizes or contours of said ears, said slitting being performed efficiently and without damage to the delicate corn grains underlying the husks.

A further and important advantage attributable to the independently mounted presser wheels 78 is that, with an increase in diameter of the corn treated, the points of contact between presser wheels and aligner rolls, severally, spread further apart from one another thus more evenly to distribute engagement between the contacting parts of the mechanism and the side portions of the ear. This procedure results in the accurate maintenance of the ear in its prescribed course of travel with its under side in the aforementioned fixed course of travel. The spreading of the aligner rolls 71 also serves to laterally displace or separate the husks so as to facilitate subsequent removal thereof as previously described.

The importance of carrying the ear through a certain and fixed course of travel will be readily apparent after consideration of the carrier mechanism which transfers the ears from their final aligned position directly to the cutting knives, the operation of which is described in detail in a following portion of this specification.

As the ears are moved between the driven presser wheels 78 and aligned rolls 71 and the slitting knives 137, 139 carried thereby, the forward portion of the ear next engages the surfaces 107 and 112 respectively of the presser plates 105 and retarding plates 108, the retarding plates yielding downwardly and acting under the influence of the springs 110 in such manner that endwise movement of the ear is resisted and the shoulder of the ear thus caused to travel about a portion of the aligner rolls. The weight of the presser assembly, including the presser wheels and plates, and the spring 88, serve at this time to keep the shoulder of the ear in firm contact with the aligner rolls 71 so that husk, about the grain shoulder of the ear, is slightly crushed to enable the ear portion at the grain shoulder to travel close to the contacting portion of the aligner rolls thus automatically "locating" the grain shoulder for the final aligned position of the ear.

As the ear, with its portion at the grain shoulder bearing upon the adjusted aligner rolls 71, travels about the portion of the aligner rolls as stated, it will gradually move downwardly lowering the presser assembly, although at this time the aligner rolls 71 will not move inwardly because of the lost motion connection, in the linkage between the presser assembly and aligner assembly including the slotted arm 98, until the ear is in its final aligned position with the grain shoulder in vertical registry with the cutting knives 118 and 119.

When the ear arrives at its said finally aligned position, it is engaged by the teeth 126 and 127 of the carrier wheels in such manner that the ear is carried vertically downwardly, its butt being forced through the cutting knives and severed from the grain bearing portion of the ear, and in each event, exactly at the grain shoulder. During such travel of the ear, the springs 131 will yield to permit the pairs of carrier wheels to move apart an amount determinable by the size of the ear, so that firm engagement between the carrier wheels and the ear at spaced points intermediate the length of the ear is maintained.

The ear, during its passage from its finally aligned position through the cutting knives, will cause the retarding plates 108 to be moved downwardly, against the action of the springs 110, as such travel progresses. When a small ear of corn is being carried downward, movement of the retarding plates will be aided by contact between the presser plates 105 and the bosses 114 of the retarding plate assemblies.

In the event that the butt of the ear has a stalk portion of sizeable dimension, the adjacent feed-in rollers 57, or both sets of rollers 56 and 57, may be urged downwardly by engagement of the stalk therewith to permit its passage as the ear is carried downwardly by the carrier wheels. With reference to Fig. 5 it will also be noted that the angular relationship of the axes of the aligner rolls 71 is such that once the stalk portion of the butt has passed between the upper portions of the aligner rolls the stalk is immediately relieved from any possible retarding contact with the end surfaces of the rolls, a condition which would not exist should the aligner rolls be located on a common axis as heretofore proposed.

After each corn ear has been debutted and the husks thereon longitudinally slit as hereinbefore described, the ruffler elements 138, which remain relatively stationary as the ear is carried downwardly by the carrier wheels, act to bite into the husk thus to tear the husk away from the grain rows and in general to render the husk susceptible to ready removal by the husking tumblers 5. After the husk ruffling function, each corn ear is dropped, while in a horizontal position, as last carried by the wheels 124 and 125, directly upon the inclined surface 142 where the butt end striking first will cause the ear to move with its tip first engaging with the tumbler rolls 5. This latter movement of the ears is clearly indicated in dotted lines in Fig. 1.

The present invention also comprehends the provision of husking or tumbler rolls 5 of improved form capable of more efficiently stripping off the corn husks than are the conventional forms of such rolls heretofore used. These improved husking or tumbler rolls 5 are illustrated in detail in Figures 9 and 10 from which it will be observed that the rolls are elliptical in cross section and have the corn ear engaging surfaces thereof formed of live rubber, thereby to yieldably engage with each other and with the ears of corn from which the husks are to be stripped.

The rolls illustrated in Figures 9 and 10 each include a shaft portion 143 rotatably mounted in suitable anti-friction bearings 144 and having a spiral cut gear 145 affixed thereon in position for meshing with and being driven by a similar gear mounted on the driving cross shaft in the manner indicated by dotted lines in Figure 1 of the drawings. Each shaft 143 includes a core portion 146 upon which the rubber sleeve 147 forming the corn ear engaging body portion of the roll is mounted between end abutment collars 148. The rubber sleeve may be held on the cores 146 by interfitting groove equipments 149 and, if desired, the union between the rubber sleeve and the core of each roll may be additionally secured by vulcanizing.

The peripheral surfaces of the elliptically shaped rolls which mutually engage, and which engage in husk stripping relation with the corn ears, are provided with intermeshing ribs 150 which serve to grip the corn husks firmly between them and forcibly strip them from the ear of corn. It will be observed by reference to Figure 10 of the drawings that the cores are flatted along the major axis of each roll, as at 151, thereby to materially increase the amount of live rubber presented in the direction of the major axis of the roll without objectionably destroying the desired rigidity of the roll.

By forming the rolls elliptically, as hereinbefore described, the corn ears engaged by the rolls are tossed about as they are being husked, or, in other words, subjected to a tumbling action while the husks are being stripped therefrom, thereby to prevent slow clogging of the ears on the rolls and facilitate the husking action. Also, by forming the husking rolls of rubber and providing a maximum of yielding surface in the direction of the major axes of the rolls, by reason of flatting the cores at 151, the tumbling or tossing about of the corn ears is provided for without minimizing the area of roll surface presented in gripping contact with the corn husks. When the husk engaging surfaces of non-yielding elliptical rolls are presented in engagement with husks in the direction of the major axis of a given roll, the smallest diameter portion of the roll is presented and a minimum of husk gripping surface would ordinarily be presented. However, in our improved rolls, formed of yielding rubber, and by reason of the provision of a maximum of yield in the direction of the major axis of a given roll, the rubber at the small diameter sides of the rolls can be compressed against the relatively more rigid engaging surface of the opposing roll in the direction of the minor axis of said opposing roll and thereby present a husk gripping surface of a greater area than would otherwise be provided, thereby to more efficiently grip the corn husks and forcibly strip them from the ears of corn.

This feature of providing husking rolls having yielding, cooperatively engaging peripheral surfaces, the yielding qualities of which contacting surfaces are differential in the respective rolls of any two engaging rolls regardless of the point of contact, is an outstanding feature, and the rolls need not necessarily be elliptical at the surface and include flattened cores in order to provide these differential yield qualities. For example, a roll having a round core surrounded by an off center surrounding portion of rubber can be used, or an elliptical rubber roll having a round core instead of the flattened core of Figures 9 and 10 can be employed.

The important feature of the invention with respect to the husking rolls is that of providing for differential flattening of the opposing roll surfaces during contact thereof with husks passing therebetween. It will be obvious that the differential flattening is brought about by reason of the constant presentation of a relatively thick rubber portion of one roll opposite a relatively thin rubber portion of the opposing roll in close proximity so as to tightly press the husks therebetween. In other words, references herein to engagement of the rolls are to be construed as meaning effective proximity for husking and differential yielding purposes whether the opposing roll surfaces be in normal surface contact or normally spaced a limited distance and yet in such close proximity as to provide pressure contact with the husks and the desired differential yielding of the opposing roll surfaces as the corn husks are drawn between the rolls.

It will be apparent from the foregoing that a machine constructed in accordance with our invention, subjects each ear of corn treated therein to identical, efficient slitting, debutting, ruffling and husking procedure, no matter what its length or diameter may be, nor however it may vary as to girth contour.

It will also be apparent that the machine by virtue of its construction and the arrangement of its parts is unusually compact. The housings enclosing all of the driving gear trains and the assemblies upon the primary shafts 17 are all so designed as to facilitate lubrication by simple operation and in conventional manner. Ball bearings have been indicated as providing efficient anti-friction mountings for moving parts, although of course such bearings may be replaced, in manufacture, for any other desirable bearing means as particular requirements may dictate. This feature is in part attributable to the compact assemblies upon the primary shafts 17 and to the use of rotating carrier wheels in place of the more cumbersome carrier chains of previous machines, the use of which is made possible largely because of our improved aligning means as herein described.

It will be understood that while we have illustrated but one particular embodiment of our invention, in the form of a complete husking machine, that such embodiment may be varied greatly, as to design, without departing from within the spirit and scope of our invention as set forth in the appended claims.

We claim:

1. The method of husking corn which comprises, moving corn ears and a slitting means relatively in the direction of the length of the corn ears in a manner for longitudinally slitting the corn husks on the corn ears and at the same time bringing about relative movement between the slitting means and the corn ears in a direction across the length of the ears in such manner as to render the slitting means effective also in pulling the slit husks apart as the slitting progresses, debutting said ears immediately after the slitting and pulling apart of the husks and by a transverse cut across the slitting, and gripping and tearing the longitudinally slit husks from the debutted ears.

2. In a corn husking machine, corn ear moving means, corn ear slitting means, means for bringing about relative movement between the corn ear moving means and the slitting means in the direction of the length of a corn ear carried on the moving means to cause the slitting means to longitudinally slit the corn husks on the corn ear, and means for bringing about relative movement between the corn ears and the slitting means in a direction across the length of the corn ear while the longitudinal slitting of the husks is in progress to render the slitting means effective to pull the slit husks apart.

3. In a corn husking machine, means for feeding corn ears in the direction of their length butt end rearmost, at least one rotor rotatable about an axis traversing the path of travel of the ears, said rotor having rolling contact with the traveling ears, a slitting disk carried by said rotor, presser means for holding each traveling ear against the rotor to cause the slitting disk to follow the contour of the corn ear and slit the same from the tip end of the ear clear around over the grain shoulder at the butt of the ear, and a debutting cutter disposed transversely of the line of feed of the ears and adjacent said rotor for debutting the ears by a cut traversing the slitting in the husk at the bases of the butts.

4. In a corn husking machine, means for feeding corn ears in the direction of their length butt end rearmost, a pair of laterally spaced aligner rolls rotatable about axes traversing the path of travel of the ears and having rolling contact with the traveling ears, a slitting disk carried by each aligning roll, a debutting cutter disposed transversely of the line of feed of the ears and adjacent said aligning rolls, and presser means for holding traveling ears against the aligning rolls to cause the disks to slit the husks endwise of the ears and the ear butt portions to follow partially around the rolls to assure slitting the husks well down over the grain shoulders at the butts and align the butts with said debutting cutter so that the debutting cut will in each case be made across the slits at the base of each ear butt.

5. In a corn husking machine wherein is provided means for feeding corn ears one after another in the direction of their length, means for longitudinally slitting the husks on said ears to facilitate subsequent removal thereof comprising a plurality of rotary corn ear engaging slitter knives spaced circumferentially about the traveling ears of corn, means rotatable with said knives for limiting the depth of husk slitting penetration thereof so as to avoid damaging the delicate corn grains beneath the husks, and means for shifting certain of said knives laterally toward and from each other accordingly as the size and contour of the corn ears vary, said last named means including devices for causing certain of said knives to move in the direction of their axes during said varying of knife spacing thereby to effect a pulling apart and loosening of the husks from the corn ears.

6. In a corn husking machine, spaced aligning devices rotatable about inclined axes diverging outwardly from the path of travel of corn ears, means for supporting said aligning devices whereby they may be shifted longitudinally of their axes, means for supporting and feeding corn ears one after another endwise over the aligning devices, rotary slitters mounted on and movable with said aligning devices and effective to longitudinally slit the husks on corn ears moving over said aligning devices, means operated upon by corn ears for shifting the aligning devices along their axes for varying their spacing accordingly as the sizes and contours of corn ears vary.

7. In a corn husking machine, spaced aligning devices rotatable about inclined axes diverging outwardly from the path of travel of corn ears, means for supporting and feeding corn ears one after another endwise over the aligning devices whereby ear butts will engage said aligning devices and be positioned thereby for properly engaging the debutting means, an independently movable presser device associated with each aligning device and connected thereto so as to shift the aligning devices along their axes independently for positioning the same to correspond to the size and contour of ears engaged thereby, a corn husk slitting element carried by each aligning device and presser device and effective to longitudinally slit the husks on corn ears engaged by said aligning and presser devices.

8. In a corn husking machine, spaced aligning rolls rotatable about inclined axes diverging outwardly from the path of travel of corn ears, means for supporting and feeding corn ears one after another endwise over the aligning rolls whereby ear butts will engage said aligning rolls and be positioned thereby for properly engaging the debutting means, an independently movable presser wheel associated with each aligning roll and connected thereto so as to shift the aligning rolls along their axes independently for positioning the same to correspond to the size and contour of ears engaged thereby, a corn husk slitting disk carried by each aligning roll and presser wheel and effective to longitudinally slit the husks on corn ears engaged by said aligning and presser wheels.

9. In a corn husking machine, spaced aligning devices effective to position ears for debutting, each aligning device including a housing, an aligning roll supported on a member rotatable in said housing, and a sleeve connected to said rotatable member and movable endwise in said housing; a yieldably mounted presser wheel opposed to each aligning roll and connected to the respective sleeve so as to shift the sleeve endwise in its housing accordingly as the sizes and contours of corn ears passing between said wheels and rolls vary, a corn husk slitting disk mounted on and movable with each said roll and wheel and effective to longitudinally slit the husks of corn ears passing between said wheels and rolls, and means for feeding corn ears one after the other endwise to said wheels and rolls.

10. In a corn husking machine, spaced aligning devices effective to position ears for debutting, each aligning device including a housing, an aligning roll supported on a member rotatable in said housing, and a sleeve connected to said rotatable member and movable endwise in said housing; a yieldably mounted presser wheel opposed to each aligning roll and connected to the respective sleeve so as to shift the sleeve endwise in its housing accordingly as the sizes and contours of corn ears passing between said wheels and rolls vary, each said wheel and sleeve connection including a lost motion effective to permit a downward movement of the respective presser wheel independently of the endwise movement of the respective sleeve and the connected aligning roll, a corn husk slitting disk mounted on and movable with each said roll and wheel and effective to longitudinally slit the husks of corn ears passing between said wheels and rolls, and means for feeding corn ears one after the other endwise to said wheels and rolls.

11. In a corn husking machine, opposed aligning devices for positioning corn ears for debutting, means for supporting said aligning devices for independent movement, means for supporting and feeding corn ears one after another in endwise direction to the aligning devices, independently movable presser devices connected to the respective aligning devices and contacting with endwise moving corn ears for automatically shifting the aligning devices toward and from each other in a plane traversing the direction of feed travel of the corn ears and to an extent determined by the size and contour of the engaged corn ear portions, and slitting means mounted on and movable with the aligning devices and the presser devices and effective to longitudinally slit the husks of endwise moving corn ears and also to pull apart and loosen the slit husks from the corn ears.

12. In a corn husking machine, opposed aligning devices for positioning corn ears for debutting, means for supporting said aligning devices for independent movement, means for supporting and feeding corn ears one after another in endwise direction to the aligning devices, independently movable presser devices connected to the respective aligning devices and contacting with endwise moving corn ears for automatically shifting the aligning devices toward and from each other in a plane traversing the direction of feed travel of the corn ears and to an extent determined by the size and contour of the engaged corn ear portions, the connecting means between each presser device and its associated aligning device including a lost motion whereby the presser devices may move downwardly independent of any shifting movement of the aligning devices, and slitting means mounted on and movable with the aligning devices and the presser devices and effective to longitudinally slit the husks of endwise moving corn ears and also to pull apart and loosen the slit husks from the corn ears.

13. In a corn husking machine, opposed aligning devices for positioning corn ears for debutting, means for supporting said aligning devices for independent movement, means for supporting and feeding corn ears one after another in endwise direction to the aligning devices, independently movable presser devices connected to the respective aligning devices and contacting with endwise moving corn ears for automatically shifting the aligning devices toward and from each other an extent determined by the size and contour of the engaged corn ear portions, slitting means mounted on and movable with the aligning devices and the presser devices and effective to longitudinally slit the husks of endwise moving corn ears, each said aligning device including a corn ear engaging rotary roll, each said presser device including a corn ear engaging rotary wheel, and said slitting means comprising disks mounted directly on and projecting only a limited distance beyond the corn ear engaging surface of the respective rolls and wheels.

14. In a corn husking machine, opposed aligning devices for positioning corn ears for debutting, means for supporting said aligning devices for independent movement, means for supporting and feeding corn ears one after another in endwise direction to the aligning devices, independently movable presser devices connected to the respective aligning devices and contacting with endwise moving corn ears for automatically shifting the aligning devices toward and from each other an extent determined by the size and contour of the engaged corn ear portions, the connecting means between each presser device and its associated aligning device including a lost motion whereby the presser devices may move downwardly independent of any shifting movement of the aligning devices, slitting means mounted on and movable with the aligning devices and the presser devices and effective to longitudinally slit the husks of endwise moving corn ears, each said aligning device including a corn ear engaging rotary roll, each said presser device including a corn ear engaging rotary wheel, and said slitting means comprising disks mounted directly on and projecting only a limited distance beyond the corn ear engaging surface of the respective rolls and wheels.

15. In a corn husking machine, husk stripping rolls rotatable in surface engagement one with another and elliptical in cross section, said engaging stripper roll surfaces being provided with intermeshing longitudinal rib and groove equipments and formed of rubber thereby to be yieldable so as to present a maximum of husk gripping and stripping area for engagement with the husks without impairing the corn ear tumbling effect of the elliptical shaping of said rolls, and each said roll having a rigid core which is flatted in the direction of the major axis of the roll so as to provide a preponderance of yielding rubber in the direction of the major axis of said rolls.

16. In a corn husking machine, cooperatively opposing husking rolls disposed side by side, means for causing the rolls to rotate in unison, each said roll having a rigid core and a surrounding body of yieldable material placed to present at least one side thereof eccentrically with relation to the core center thereby to provide a yieldable surface portion of progressively and gradually increasing thickness followed by another yieldable surface portion of progressively and gradually decreasing thickness, and said rolls being so cooperatively placed and held by said rotating means that a gradually increasing yieldable thickness on one roll always will closely approximate and oppose a gradually decreasing yieldable thickness on the opposing roll.

17. In a corn husking machine, cooperatively opposing husk stripping rolls elliptical in cross section and rotatable with opposing external surfaces in constantly close proximity and each including a rigid core and a surrounding body of yieldable material, the elliptical external surface of each roll and the respective core being so related that a relatively thin yieldable body portion of one roll will oppose a relatively thick yieldable body portion of the other roll during the rotation of the rolls so as to provide for a differential yielding of the yieldable material of the engaging portions of the rolls during effective rotation thereof.

18. In a corn husking machine, cooperatively opposing husk stripping rolls elliptical in cross section and rotatable with opposing external surfaces in constantly close proximity, said engaging stripper roll surfaces being provided with intermeshing longitudinal rib and groove equipments and formed of rubber externally and each including a core so disposed relative to the external rubber surface of the respective roll as to provide a greater thickness of rubber covering at the diametrically opposite portions at the sides of the roll across the maximum diameter of the ellipse cross section than is provided on the diametrically opposite portions at the sides of the roll across the minimum diameter of the ellipse cross section thereby to render the rubber roll surfaces yieldable in a manner permitting differential flattening of opposing roll surfaces during effective rotation of the rolls and resultant presentation of a maximum of husk gripping and stripping area for engagement with the husks without impairing the corn ear tumbling effect of the elliptical shaping of said rolls.

RALPH COVER.
GEORGE OSBURN.